US012680520B2

(12) United States Patent
Aupetit et al.

(10) Patent No.: US 12,680,520 B2
(45) Date of Patent: Jul. 14, 2026

(54) TURBINE ENGINE ASSEMBLY WITH NUT DEVICE AND THERMAL EXPANSION COMPENSATION

(71) Applicant: SAFRAN CERAMICS, Le Haillan (FR)

(72) Inventors: Christophe Paul Aupetit, Moissy-Cramayel (FR); Charles Joseph Leleu, Moissy-Cramayel (FR); Thierry Guy Xavier Tesson, Moissy-Cramayel (FR)

(73) Assignee: SAFRAN CERAMICS, Le Haillan (FR)

( * ) Notice: Subject to any disclaimer, the term of this patent is extended or adjusted under 35 U.S.C. 154(b) by 0 days.

(21) Appl. No.: 18/860,742

(22) PCT Filed: Apr. 25, 2023

(86) PCT No.: PCT/FR2023/000055
§ 371 (c)(1),
(2) Date: Oct. 28, 2024

(87) PCT Pub. No.: WO2023/209290
PCT Pub. Date: Nov. 2, 2023

(65) Prior Publication Data
US 2025/0314216 A1 Oct. 9, 2025

(30) Foreign Application Priority Data
Apr. 29, 2022 (FR) ........................................ 2204093

(51) Int. Cl.
*F02K 1/04* (2006.01)

(52) U.S. Cl.
CPC ............ *F02K 1/04* (2013.01); *F05D 2260/31* (2013.01); *F05D 2260/941* (2013.01); *F05D 2300/5021* (2013.01)

(58) Field of Classification Search
CPC ...... F02K 1/04; F02K 1/82; F02C 6/20; F02C 7/32; F02C 7/20
See application file for complete search history.

(56) References Cited

U.S. PATENT DOCUMENTS

2008/0178465 A1    7/2008   Schiavo et al.
2015/0075176 A1    3/2015   Ruthemeyer et al.
(Continued)

OTHER PUBLICATIONS

International Search Report in corresponding International Patent Application No. PCT/FR2023/000055, mailed Jul. 24, 2023, 2 pages, English Translation Only.

*Primary Examiner* — Phutthiwat Wongwian
*Assistant Examiner* — Jacek Lisowski
(74) *Attorney, Agent, or Firm* — Cozen O'Connor

(57) ABSTRACT

An assembly for a turbine engine having a longitudinal axis includes a first structural element and a nut device, the first structural element having a first hole and a second hole, and the nut device having a retainer fixed to an inner face of the first structural element, the retainer comprising at least a first recess and a second recess connected to one another by a connecting element, the first recess and the second recess each retaining a nut respectively aligned with the first hole and the second hole which are formed through the first structural element, the connecting element being, in whole or in part, adapted to compensate for a greater thermal expansion of the retainer than the thermal expansion of the first structural element.

10 Claims, 7 Drawing Sheets

(56)     References Cited

U.S. PATENT DOCUMENTS

2019/0093516 A1*   3/2019   Wootton ................... F02C 7/32
2020/0180773 A1*   6/2020   Blacha ................. B64D 27/404

* cited by examiner

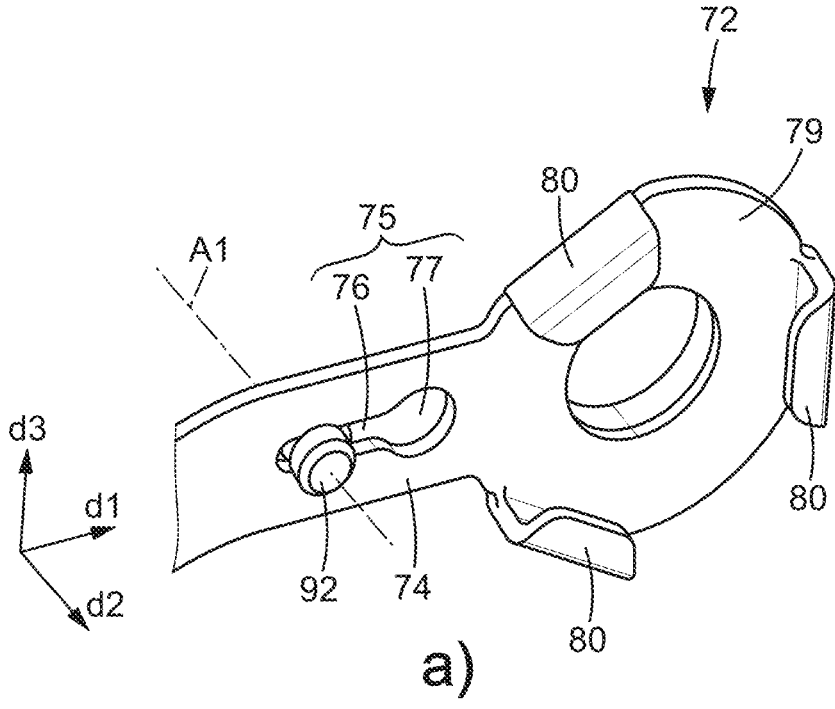
a)
FIG. 6
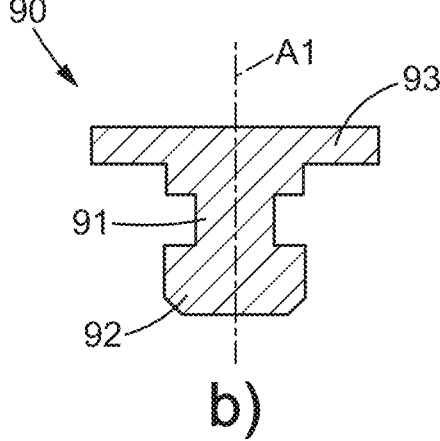
b)

a)                              b)

TURBINE ENGINE ASSEMBLY WITH NUT DEVICE AND THERMAL EXPANSION COMPENSATION

CROSS-REFERENCE TO RELATED APPLICATIONS

This application is a US National phase Application of PCT/FR2023/000055 filed Apr. 25, 2023, which claims priority to French Patent Application No. 2204093 filed Apr. 29, 2022, both of which are hereby incorporated by reference in their entirety.

TECHNICAL FIELD

This description relates to an assembly for a turbine engine. In particular, this description relates to a turbine engine exhaust cone comprising such an assembly and to a turbine engine comprising such an exhaust cone.

BACKGROUND

Conventionally, as shown in FIG. 1, a turbine engine 10 of the turbofan type with a longitudinal axis comprises, from upstream to downstream in the direction of circulation of gases in turbine engine 10: a fan 12, a low-pressure compressor 14a, a high-pressure compressor 14b, a combustion chamber 16, a high-pressure turbine 18a, a low-pressure turbine 18b, and an exhaust nozzle 20. High-pressure compressor 14b and low-pressure compressor 14a are respectively connected to a high-pressure turbine 18a and a low-pressure turbine 18b by a respective shaft extending in the longitudinal direction of rotation of the shafts of the turbine engine. In the following, orientation qualifiers such as "longitudinal", "radial", and "circumferential" are defined in reference to the longitudinal axis X.

The air flow entering the turbine engine is divided, downstream of fan 12, into a primary annular air flow entering an annular flow path 22a referred to as primary, and a secondary annular air flow entering an annular flow path 22b referred to as secondary which surrounds the primary annular flow path 22a. The working parts of low-pressure compressor 14a and high-pressure compressor 14b, combustion chamber 16, and high-pressure turbine 18a and low-pressure turbine 18b, are located in primary annular flow path 22a.

An exhaust casing 30 is located directly at the outlet of low-pressure turbine 28b. Exhaust casing 30 comprises a radially inner shell 32 and a radially outer shell 34. An annular space formed between the inner shell and the outer shell forms a portion of primary flow path 22a at the outlet of low-pressure turbine 18b.

Exhaust nozzle 20, or propelling nozzle, of turbine engine 10 comprises an assembly which allows optimizing the flow of hot gases exiting the turbine. This assembly may also have the function of absorbing at least some of the noise generated by the interaction of these hot gases with the ambient air and with the flow of cold air from the fan.

This assembly comprises an exhaust cone 40, visible in FIG. 2, which comprises an upstream portion 40, of substantially axisymmetric shape around the longitudinal axis X, and a downstream portion 40b of conical shape along the longitudinal axis X. Upstream portion 40a comprises a radially external annular noise-reducing wall 42 and a noise reduction enclosure arranged radially internally to the annular noise-reducing wall. The noise reduction enclosure comprises a radially internal annular wall 44. The radially external face of annular noise-reducing wall 42 of upstream portion 40a and the radially internal face of conical downstream portion 40b together define, radially internally, primary flow path 22a at exhaust cone 40.

Internal annular wall 44 of the noise reduction enclosure and annular noise-reducing wall 42 each comprise a plurality of sectors arranged circumferentially end to end. Two circumferentially adjacent sectors of internal annular wall 44, or of annular noise-reducing wall 42, are screwed to each other. Furthermore, downstream, internal annular wall 44 of the noise reduction enclosure and/or annular noise-reducing wall 42 may be screwed to downstream portion 40b of exhaust cone 40. Alternatively, downstream, internal annular wall 44 of the noise reduction enclosure and/or annular noise-reducing wall 42 may be screwed to each other and one among internal annular wall 44 of the noise reduction enclosure and/or annular noise-reducing wall 42 may be screwed to downstream portion 40b of exhaust cone 40. To do so, it is known to use floating nut devices due to the lack of radial access to the interior of exhaust cone 40.

Among floating nut devices, a floating nut device is known comprising a retainer which includes a plurality of recesses each receiving a nut. The retainer is secured to a first structural member which is intended to be screwed to a second structural member such that each nut is aligned with a pair of holes respectively formed through the first structural member and the second structural member. A screw is then inserted into each pair of holes in order to be screwed into the respective nut retained in one of the recesses of the retainer so as to secure the first structural member to the second structural member.

The current tendency is to make internal annular wall 44, annular noise-reducing wall 42, and conical downstream portion 40b of exhaust cone 40, of ceramic matrix composite (CMC) material while the retainer of a floating nut device as described above is generally made of a metal material. CMC materials withstand relatively high temperatures and therefore require less cooling. This cooling traditionally results from intake from the compressor which impacts the efficiency of the turbine engine; CMC materials thus make it possible to improve engine efficiency and consequently fuel consumption. Furthermore, their use contributes to reducing the mass of turbine engines. However, the coefficient of thermal expansion of a ceramic matrix composite is significantly lower than the coefficient of thermal expansion of a metal. Therefore, when such a floating nut device is used at exhaust cone 40, as the temperature rises during operation of the turbine engine, the retainer of the floating nut device has greater thermal expansion than that of the structural element to which it is fixed among internal annular wall 44, annular noise-reducing wall 42, and downstream portion 40b of exhaust cone 40. As a result, mechanical stresses are induced in the structural element among internal annular wall 44, annular noise-reducing wall 42, and downstream portion 40b of exhaust cone 40 to which the retainer of the floating nut device is fixed, at each point of attachment of the retainer of the nut device, which may result in damage to these elements.

SUMMARY

An assembly for a turbine engine of longitudinal axis is provided, the assembly comprising a first structural element and a nut device, the first structural element comprising a first hole and a second hole, the nut device comprising a retainer fixed to an inner face of the first structural element, the retainer comprising at least a first recess and a second recess connected to one another by a connecting element, the first recess and the second recess each retaining a nut aligned respectively with the first hole and the second hole which are formed through the first structural element, the connecting element being adapted, in whole or in part, to compensate for a greater thermal expansion of the retainer than the thermal expansion of the first structural element.

The alignment between each nut and the respective hole formed through the first structural element is thus maintained during operation of the turbine engine, in particular when the first structural element and the nut device are subjected to high temperatures. The stresses exerted on the first structural element due to the greater thermal expansion of the retainer of the nut device are reduced. As a result, the risk of damage to the first structural element is reduced or even eliminated.

Each recess may be adapted to retain the respective nut in a floating manner. "Floating" is understood to mean that limited movement of the nut in the respective recess of the retainer is permitted.

The first recess and the second recess of the retainer of the nut device may be spaced apart from each other in a first direction, the connecting element being deformable, in whole or in part, to compensate for the greater thermal expansion of the retainer between:

a rest state in which the connecting element is subjected to a first temperature and in which the connecting element is in a conformation having a first dimension in a second direction perpendicular to the first direction, and an expanded state in which the connecting element is subjected to a second temperature which is higher than the first temperature and in which the connecting element is in a conformation having a second dimension in the second direction, the second dimension being different from the first dimension.

The second dimension may be greater than the first dimension. The connecting element may be a rod extending generally in the first direction between the first recess and the second recess. The rod may have a thickness adapted to facilitate its deformation in the second direction. The thickness of the rod may be less than or equal to 2 mm, preferably less than or equal to 1 mm. In particular, the ratio between the length of the rod in the first direction and the thickness of the rod may be on the order of 100. For example, the rod may have a thickness on the order of 1 mm and a length on the order of 100 mm. The connecting element of the nut device may be elastically deformable, in whole or in part. This makes it possible to limit or even prevent breakage of the connecting element.

In other words, the connecting element may be configured to have a variation in shape, between the rest state in which the connecting element is subjected to the first temperature and the expanded state in which the connecting element is subjected to a second temperature, so as to separate or spread the recesses apart relative to each other in the first direction. In particular, the variation in shape of the connecting element from the rest state to the expanded state may spread the recesses apart relative to each other in the first direction. Conversely, the variation in shape of the connecting element from the rest state to the expanded state may move the recesses closer together in the first direction.

The conformation of the connecting element in the rest state may be a bowing in the second direction. The conformation of the connecting element in the expanded state may be a bowing in the second direction. The maximum deflection formed by the bowing of the connecting element in the rest state may be less than the maximum deflection formed by the bowing of the connecting element in the expanded state.

In the rest state and/or in the expanded state, the connecting element may have, in whole or in part, a cross-section in the shape of a V, S, or circle in a plane which comprises at least the first direction, and preferably which comprises the first direction and the second direction.

The first structural element may be made of a material whose coefficient of thermal expansion is lower than the coefficient of thermal expansion of a material in which the retainer of the nut device is made. Preferably, the coefficient of thermal expansion of the material in which the first structural element is made is between 2 and 2.5 times lower than the coefficient of thermal expansion of the material in which the retainer of the nut device is made. The first structural element may be made of a ceramic matrix composite material. Such materials have a low density and thus allow reducing the mass of the assembly. The retainer of the nut device may be made of a metal material.

The assembly may comprise a second structural element applied to an outer face of the first structural element, the second structural element comprising a hole aligned with the first hole formed through the first structural element, the second structural element being fixed to the first structural element by a first screw which traverses the first hole formed through the first structural element and the hole formed through the second structural element, the first screw being screwed into the nut retained in the first recess of the retainer of the nut device.

The retainer is thus fixed to the inner face of the first structural element by the connection between the first screw and the nut retained in the first recess of the retainer when fixing the second structural element to the first structural element. The first structural element is thus without any specific holes for fixing the retainer of the nut device to the first structural element. This makes it possible to reduce the number of holes made in the first structural element, in order to limit damage to the first structural element.

The assembly may comprise a third structural element applied to an outer face of the first structural element, the third structural element comprising a hole aligned with the second hole formed through the first structural element, the third structural element being fixed to the first structural element by a second screw which traverses the second hole formed through the first structural element and the hole formed through the third structural element, the second screw being screwed into the nut retained in the second recess of the retainer of the nut device. Advantageously, such an arrangement allows "blind" attachment of the third structural element to the first structural element. In other words, the attachment of the third structural element to the first structural element only requires access to an outer face of the third structural element in order to insert the second screw into the corresponding holes, the nut being held in position, in particular prevented from rotating, by the retainer of the nut device.

Clearance may be provided in the first direction between the second structural element and the third structural element. This prevents the second structural element and third structural element from bearing against each other in the first direction and exerting mechanical stresses on each other when they thermally expand during operation of the turbine engine, which could damage them.

The turbine engine may comprise an exhaust cone which comprises an upstream portion of substantially axisymmetric shape around the longitudinal axis and a downstream portion of conical shape along the longitudinal axis having a cross-section that decreases in the downstream direction. The upstream portion may comprise an external annular noise-reducing wall, for example with multiple perforations, which delimits a radially internal primary annular flow path of the turbine engine at the upstream portion of the exhaust cone. The upstream portion of the exhaust cone further comprises a noise reduction enclosure arranged radially inside the annular noise-reducing wall. The enclosure may comprise an internal annular wall. The annular noise-reducing wall and the internal annular wall may each comprise a plurality of sectors arranged circumferentially end to end around the longitudinal axis.

According to a first embodiment, the second structural element may be a first sector among the plurality of sectors of the annular noise-reducing wall or of the internal annular wall, and the third structural element may be a second sector among the plurality of sectors of the noise-reducing wall, the first sector and the second sector being circumferentially adjacent.

According to a second embodiment, the second structural element may be one of the plurality of sectors of the annular noise-reducing wall or of the internal annular wall, and the third structural element may be the downstream portion of the exhaust cone. Alternatively, the second structural element may be the annular noise-reducing wall as such or the internal annular wall as such if these are implemented as one piece around the longitudinal axis.

In the first embodiment and the second embodiment, the first structural element may be a connecting piece between the second structural element and the third structural element.

According to a third embodiment, the first structural element may be one of the plurality of sectors of the internal annular wall, the second structural element may be one of the plurality of sectors of the annular noise-reducing wall, and the third structural element may be the downstream portion of the exhaust cone. Alternatively, the first structural element may be the internal annular wall and the second structural element may be the annular noise-reducing wall as such if these are implemented as one piece around the longitudinal axis.

In the first embodiment, the first direction may coincide with a circumferential direction around the longitudinal axis. The second direction may coincide with a radial direction relative to the longitudinal axis.

In the second embodiment and the third embodiment, the first direction may coincide with the longitudinal direction of the turbine engine. Alternatively, the first direction may comprise a component in the longitudinal direction and a component in the circumferential direction around the longitudinal axis. Here again, the second direction may coincide with a radial direction relative to the longitudinal axis.

An embodiment in which the second direction coincides with the longitudinal direction or with the circumferential direction around the longitudinal axis is not excluded. Similarly, an embodiment in which the second direction comprises a combination of components in one or more directions is not excluded, in particular directions among the longitudinal direction, the radial direction relative to the longitudinal axis, and the circumferential direction around the longitudinal axis.

The connecting element of the retainer may comprise a first portion which is deformable between the rest state and the expanded state, and a second portion which is less deformable than the first portion, the second portion being applied against the inner face of the first structural element, the second portion comprising a passage which comprises a guide portion extending in the first direction; the assembly further comprising a holding member which is fixed relative to the first structural element, the holding member comprising a cylindrical portion along a first axis which projects from the inner face of the first structural element, the cylindrical portion traversing the guide portion of the passage formed through the second portion of the connecting element.

Rotation of the retainer of the nut device relative to the first structural element is thus avoided when fixing the retainer to the first structural element by screwing a first screw into the nut retained in the first recess, and when fixing the third structural element to the first structural element by screwing a second screw into the nut retained in the second recess. Furthermore, the guide portion of the passage formed through the second portion of the connecting element allows the cylindrical portion of the holding member to move along the passage in the first direction when the retainer thermally expands more than the first structural element during operation of the turbine engine. The guide portion of the passage formed through the second portion of the connecting element may have the shape of a slot extending in the first direction.

The holding member may comprise a first retention portion for retention in a first directional sense along the first axis, connected to a first end of the cylindrical portion, the first retention portion having a bearing face which bears, in the direction of the first axis, against a face of the second portion of the connecting element which is opposite to the first structural element. This allows the second portion of the connecting element to be held against the inner face of the first structural element. The second portion of the connecting element may be closer to the second recess than the first portion of the connecting element. In other words, the second portion of the connecting element may be arranged between the second recess and the first portion of the connecting element. The holding member thus allows maintaining the alignment between the nut retained in the second recess of the retainer and the second hole formed through the first structural element, after the retainer has been fixed to the first structural element by screwing a first screw into the nut retained in the first recess.

The guide portion of the passage formed through the second portion of the connecting element may have a dimension in a third direction perpendicular to the first direction and to the second direction that is less than the dimension of the first retention portion of the holding member in the third direction.

The passage formed through the second portion of the connecting element may comprise an insertion portion adapted for the insertion of the first retention portion of the holding member through the passage. The insertion portion may be located at one end of the guide portion of the passage along the first direction.

The first structural element may comprise a third hole, the cylindrical portion of the holding member traversing the third hole formed through the first structural element, the holding member comprising a second retention portion for retention in a second directional sense along the first axis, connected to a second end of the cylindrical portion, the second retention portion comprising a bearing face which bears, in the direction of the first axis, against an outer face of the first structural element.

The first structural element may comprise an indentation around the third hole, such that the outer face of the first structural element forms a shoulder with which the bearing face of the second retention portion is in contact. The second retention portion may be entirely received in the indentation. The third structural element may cover an area of the outer face of the first structural element in which the indentation is formed.

According to another aspect, an exhaust cone for a turbine engine comprising an assembly as described above is proposed. According to another aspect, a turbine engine comprising an exhaust cone as described above is proposed.

According to another aspect, a method of assembling the assembly as described above is proposed, the method comprising:

applying the retainer of the nut device to the inner face of the first structural element such that the nut retained in the first recess and the nut retained in the second recess are respectively aligned with the first hole and the second hole which are formed through the first structural element;

fixing the retainer of the nut device to the first structural element.

The method may comprise applying the second structural element to the outer face of the first structural element such that the hole formed through the second structural element is aligned with the first hole formed through the first structural element.

The fixing of the retainer of the nut device to the first structural element may comprise:

inserting the first screw through the hole formed through the second structural element and the first hole formed through the first structural element;

screwing the first screw into the nut retained in the first recess of the retainer of the nut device.

In particular, the first screw may be screwed into the nut of the first recess with this recess being located at the first deformable portion side of the connecting element. The first screw can be screwed into the nut of the first recess while having access to the nut. The forces exerted on the nut of the first recess when screwing the first screw into the nut of the first recess can be countered by manually holding the nut in position. In other words, the first nut can be manually prevented from rotating while the first screw is tightened.

The method may comprise inserting the holding member into the third hole formed through the first structural element, such that the bearing face of the second retention portion is bearing, in the direction of the first axis, against the outer face of the first structural element.

Applying the retainer of the nut device to the inner face of the first structural element may comprise:

inserting the first retention portion of the holding member into the insertion portion of the passage formed through the second portion of the connecting element, moving the retainer relative to the first structural element along the first direction so as to move the cylindrical portion of the holding member along the first direction within the guide portion of the passage formed through the second portion of the connecting element and placing the bearing face of the first retention portion so that it bears against the face of the second portion of the connecting element that is opposite to the first structural element.

The method may comprise applying the third structural element to the outer face of the first structural element such that the hole formed through the third structural element is aligned with the second hole formed through the first structural element.

The method may comprise:

inserting the second screw through the hole formed through the third structural element and the second hole formed through the first structural element;

screwing the second screw into the nut retained in the second recess of the retainer of the nut device.

In particular, the second screw may be screwed into the nut of the second recess with the latter being located at the second portion side of the connecting element. This allows the tightening torque applied to the second screw to be taken up by the second portion of the connecting element, which is less deformable. The screwing of the second screw into the nut of the second recess may be carried out "blind", i.e. without having access to the nut of the second recess. The forces exerted on the nut of the second recess when screwing in the second screw can be withstood by the edges (i.e. the walls) of the guide portion of the passage formed through the second portion of the connecting element which comes to abut, in the third direction, against the cylindrical portion of the holding member. In other words, it is not necessary to intervene manually to prevent rotation of the nut of the second recess when screwing in the second screw.

BRIEF DESCRIPTION OF DRAWINGS

Other features, details and advantages will become apparent upon reading the detailed description below, and upon analyzing the attached drawings, in which:

FIG. 6 includes FIG. 6a showing a perspective view of a portion of the nut device of FIG. 4 that includes a holding member, and FIG. 6b showing the holding member of FIG. 6a;

DESCRIPTION OF EMBODIMENTS

Figure 1:
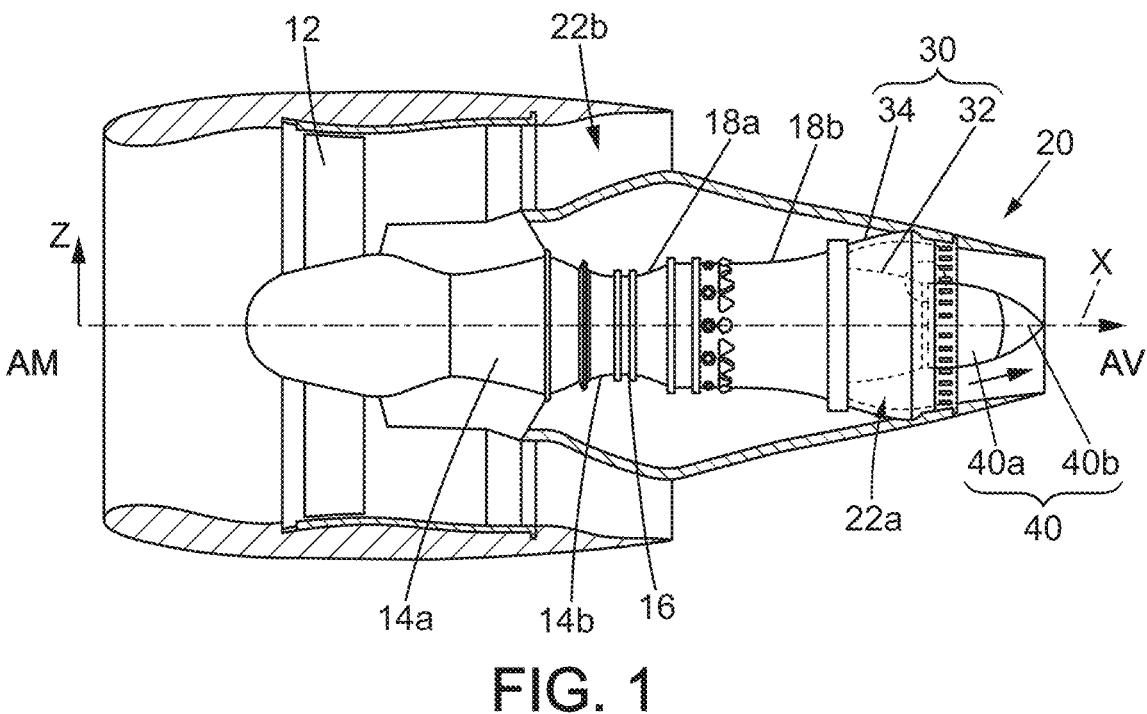
FIG. 1 is a partial schematic half-view in axial section of a turbine engine of the prior art.
Figure 2:
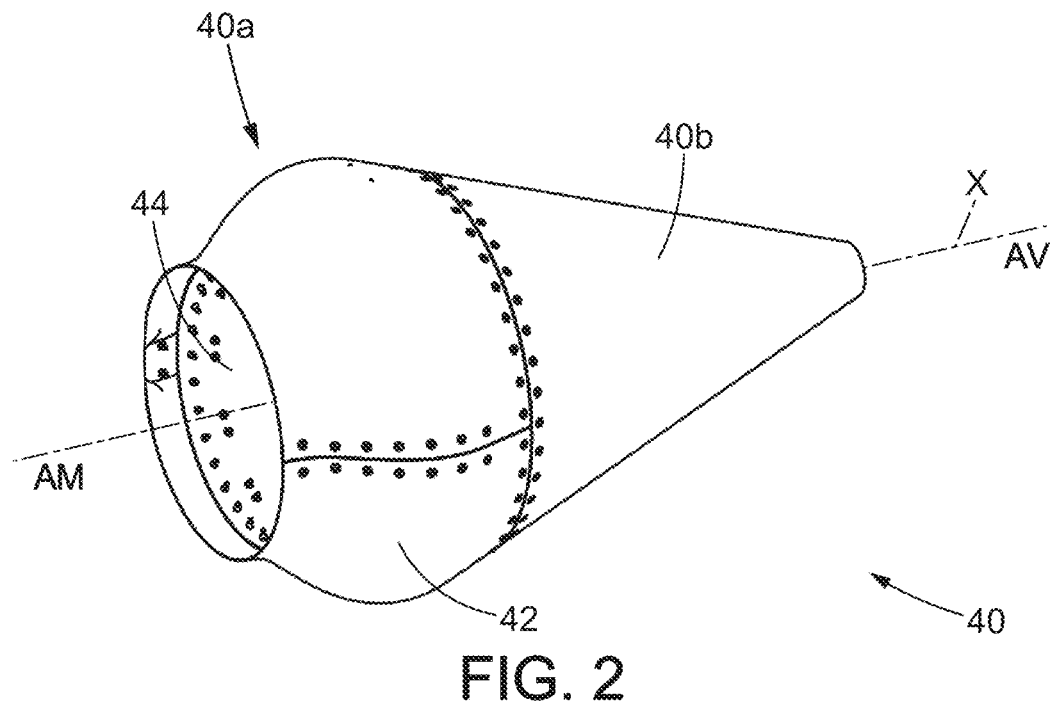
FIG. 2 is a schematic perspective view of an exhaust cone of the turbine engine of FIG. 1.
Figure 3:
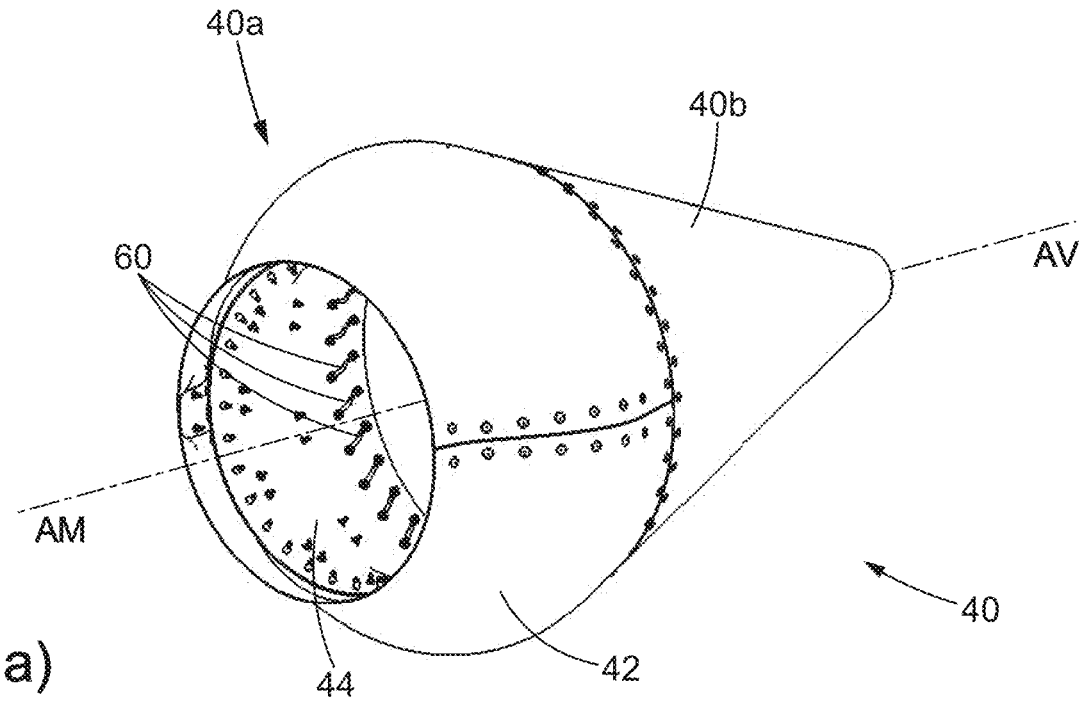
FIG. 3 includes FIGS. 3a and 3b which each show a schematic perspective view of an exhaust cone according to the present description.
Figure 3:
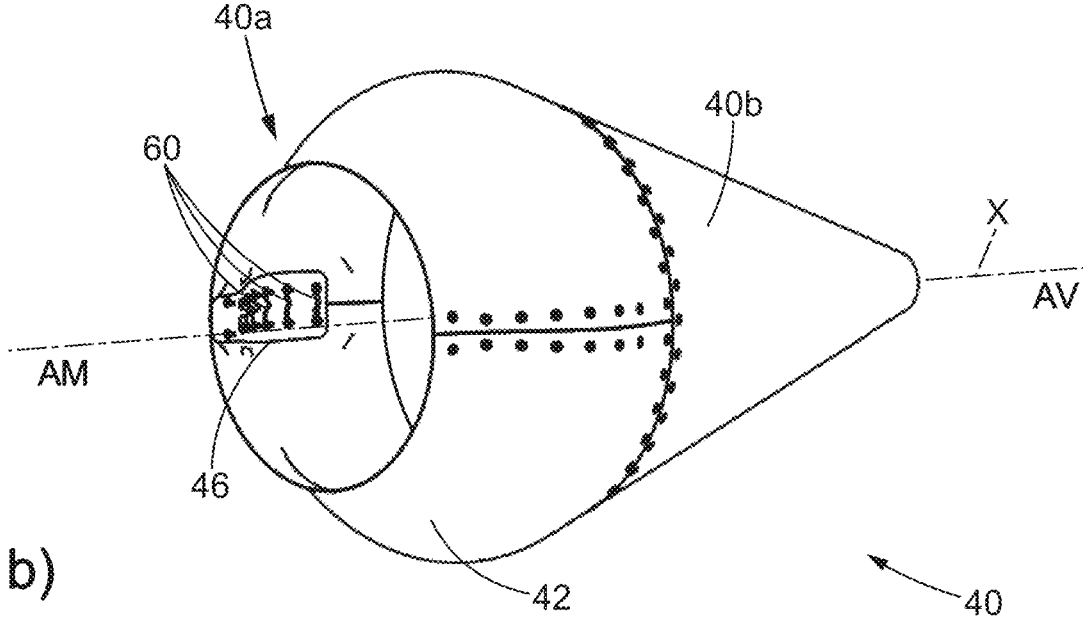

Reference is now made to FIG. 3. FIG. 3 shows an exhaust cone 40 for a turbine engine having a longitudinal axis X. In the following, orientation qualifiers such as "longitudinal", "radial", or "circumferential", are defined in reference to the longitudinal axis X. Exhaust cone 40 comprises an upstream portion 40a of substantially axisymmetric shape around the longitudinal axis X and a downstream portion 40b of conical shape along the longitudinal axis X with a cross-section that decreases in the downstream direction. Upstream portion 40a comprises an external annular noise-reducing wall 42, for example with multiple perforations, which is intended to delimit a radially internal annular primary flow path of the turbine engine. Upstream portion 40a of exhaust cone 40 further comprises a noise reduction enclosure arranged radially internally to annular noise-reducing wall 42. The enclosure is delimited radially internally by an internal annular wall 44 which can be seen in FIG. 3a. According to the illustrated example, annular noise-reducing wall 42 comprises two sectors ("half-shells") arranged circumferentially end to end around the longitudinal axis X. Furthermore, internal annular wall 44 is implemented here as one piece around the longitudinal axis X.

As can be seen in FIG. 3a, annular noise-reducing wall 42, internal annular wall 44, and downstream portion 40b are assembled together by a plurality of nut devices 60. Similarly, as can be seen in FIG. 3b, the two sectors of annular noise-reducing wall 42 are connected to each other by means of a connecting piece 46 and another plurality of nut devices 60.

A nut device 60 is described in more detail in the following, with reference to FIGS. 4 to 9.

Figure 4:
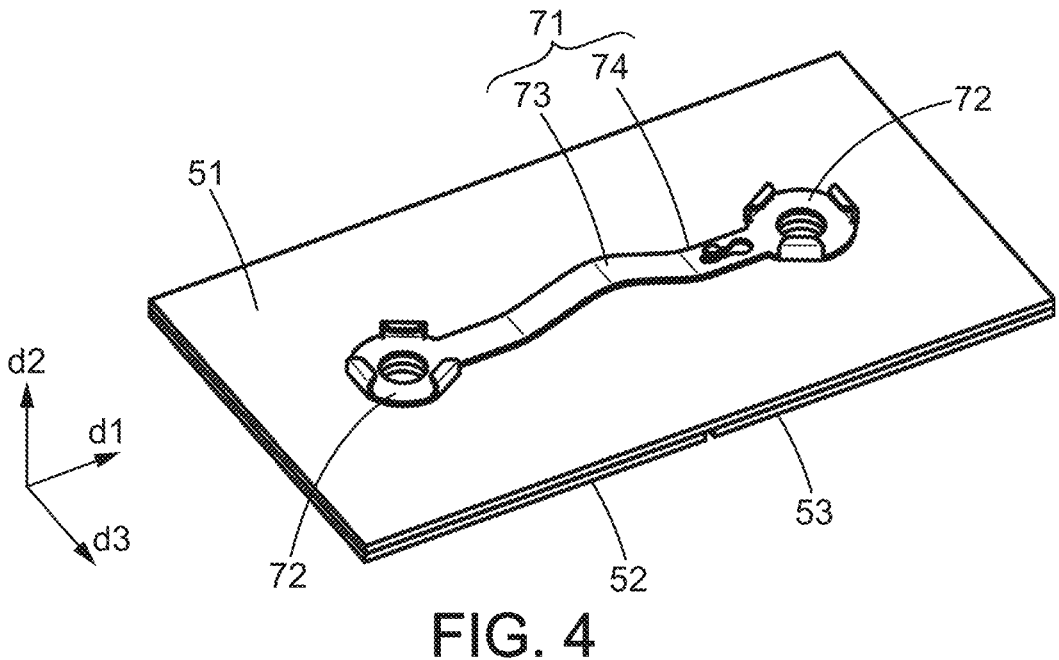
FIG. 4 is a perspective view of an assembly illustrating a first structural element, a second structural element, and a third structural element, which are fixed together by means of a nut device implemented in the exhaust cone of FIG. 3.
Figure 5:
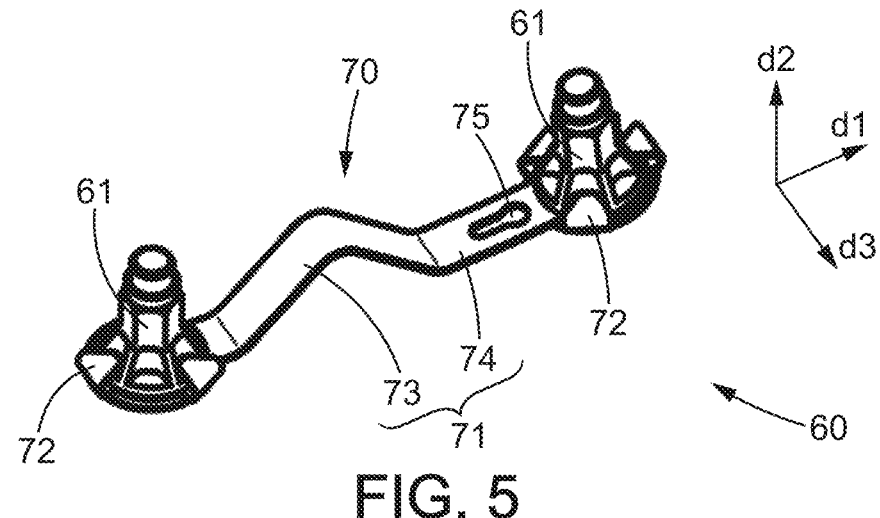
FIG. 5 is a perspective view of the nut device of FIG. 4.

FIG. 4 shows an assembly for a turbine engine comprising a first structural element 51, a second structural element 52, and a third structural element 53. The assembly further comprises a nut device 60 for connecting together first structural element 51, second structural element 52, and third structural element 53.

First structural element 51 comprises a first hole 54 and a second hole 55. First hole 54 and second hole 55 are spaced apart from each other in a first direction d1. First structural element 51 has an inner face and an outer face.

Second structural element 52 and third structural element 53 are each applied against the outer face of first structural element 51. Second structural element 52 and third structural element 53 are spaced apart from each other in first direction d1. Second structural element 52 comprises a hole 57 aligned with first hole 54 formed through first structural element 51. Similarly, third structural element 53 comprises a hole 58 aligned with second hole 55 formed through first structural element 51.

Nut device 60 firstly comprises a retainer 70. Retainer 70 is fixed to the inner face of first structural element 51. Retainer 70 comprises at least a first recess 72 and a second recess 72 connected to one another by a connecting element 71. First recess 72 and second recess 72 each retain a nut 61 (visible in FIG. 5) respectively aligned with first hole 54 and second hole 55 which are formed through first structural element 51. First recess 72 and second recess 72 of retainer 70 of nut device 60 are therefore also spaced apart from each other in a first direction d1. Here, connecting element 71 is a rod extending generally in first direction d1 between first recess 72 and second recess 72.

Each recess 72 may be capable of retaining the respective nut 61 in a floating manner. "Floating" is understood to mean that a limited movement of nut 61 within its respective recess 72 of retainer 70 is allowed. Each recess 72 comprises (is formed by) a base 79 and a plurality of tabs 80 projecting from base 79. Base 79 has a hole 81. Each nut 61 is arranged on base 79 of its respective recess 72 while being aligned with hole 81 formed through base 79. Each nut 61 is retained in a floating manner in its respective recess 72 by a complementarity of shape between each tab 80 of recess 72 and a relief 62 formed on the periphery of nut 61. According to a first variant embodiment of first recess 72 and second recess 72, shown in FIGS. 4, 6, and 8a, each tab 80 of recess 72 is engaged in an inward relief 62 formed on the periphery of nut 61. Each recess 72 comprises three tabs 80 in the first variant embodiment. According to a second variant embodiment of first recess 72 and second recess 72, shown in FIG. 8b, each tab 80 has an inward relief in which is engaged a projecting relief 62 formed on the periphery of nut 61. Here, projecting relief 62 is a rib. Each recess 72 comprises two tabs 80 in the second variant embodiment.

Second structural element 52 is fixed to first structural element 51 by a first screw 63 which traverses first hole 54 formed through first structural element 51 and hole 57 formed through second structural element 52. First screw 63 is screwed into nut 61 retained in first recess 72 of retainer 70 of nut device 60. Retainer 70 is thus fixed to the inner face of first structural element 51 by the connection between first screw 63 and nut 61 retained in first recess 72 of retainer 70, which also ensures the fixing of second structural element 52 to first structural element 51. First structural element 51 is then without any specific holes for fixing retainer 70 of nut device 60 to first structural element 51. This makes it possible to reduce the number of holes made in first structural element 51, in order to limit the risk of damage to first structural element 51.

Third structural element 53 is fixed to first structural element 51 by a second screw 63 which traverses second hole 55 formed through first structural element 51 and hole 58 formed through third structural element 53. Second screw 63 is screwed into nut 61 retained in second recess 72 of retainer 70 of nut device 60.

According to a first embodiment, second structural element 52 is one of the sectors of annular noise-reducing wall 42, and third structural element 53 is the other of the sectors of annular noise-reducing wall 42. According to the first embodiment, first structural element 51 is connecting piece 46 which connects the two sectors of annular noise-reducing wall 42. In the first embodiment, first direction d1 coincides with a circumferential direction around the longitudinal axis X.

According to a second embodiment, first structural element 51 is internal annular wall 44, second structural element 52 is one of the sectors of annular noise-reducing wall 42, and third structural element 53 is downstream portion 40b of exhaust cone 40. In the second embodiment, first direction d1 comprises a component in the longitudinal direction and a component in the circumferential direction around the longitudinal axis X.

In each of the first and second embodiments, a second direction d2 is defined that is perpendicular to first direction d1. Second direction d2 here coincides with the radial direction relative to the longitudinal axis X. Finally, a third direction d3 is also defined which is perpendicular to first direction d1 and to second direction d2.

In each of the first and second embodiments, first structural element 51 is made of a ceramic matrix composite material. Second structural element 52 and third structural element 53 are also made of a ceramic matrix composite material. Such materials have a low density and thus allow reducing the mass of the assembly. In contrast, retainer 70 of nut device 60 is made of a metal material. Therefore, first structural element 51 is made of a material whose coefficient of thermal expansion is lower than the coefficient of thermal expansion of the material in which retainer 70 of nut device 60 is made.

Thus, as shown in FIG. 7a, when the turbine engine is not in operation, the assembly is subjected to a first temperature, and first hole 54 and second hole 55 formed through first structural element 51 are spaced apart by a first spacing L1 along first direction d1. Also, first recess 72 and second recess 72 of retainer 70 of nut device 60 are spaced apart by first spacing L1 along first direction d1 as well. However, when the turbine engine is in operation, the assembly is subjected to a second temperature which is higher than the first temperature due to the circulation of hot gases in the turbine engine. As a result, first structural element 51 expands and first hole 54 and second hole 55 formed through first structural element 51 are spaced apart by a second spacing L2 along first direction d1. Second spacing L2 is greater than first spacing L1. Due to the attachment of retainer 70 to first structural element 51 by the connections between screws 63 and nuts 62, the spacing in the first direction between first recess 72 and second recess 72 of retainer 70 of nut device 60 is constrained to second spacing L2 in first direction d1. However, retainer 70 is subjected to a higher thermal expansion, which induces mechanical stresses in each fastening between one of nuts 62 and the corresponding screw 63, and then in first structural element 51.

To overcome this, connecting element 71 comprises a first portion 73 adapted to compensate for the thermal expansion of retainer 70 which is greater than the thermal expansion of first structural element 51. The alignment between each nut 61 and its respective hole 54, 55 formed through first structural element 51 is thus maintained during operation of the turbine engine, in particular when first structural element 51 and nut device 60 are subjected to high temperatures. The stresses exerted on first structural element 51 due to the higher thermal expansion of retainer 70 of nut device 60 are further reduced. As a result, the risk of damage to first structural element 51 is reduced or even eliminated.

Figure 7:
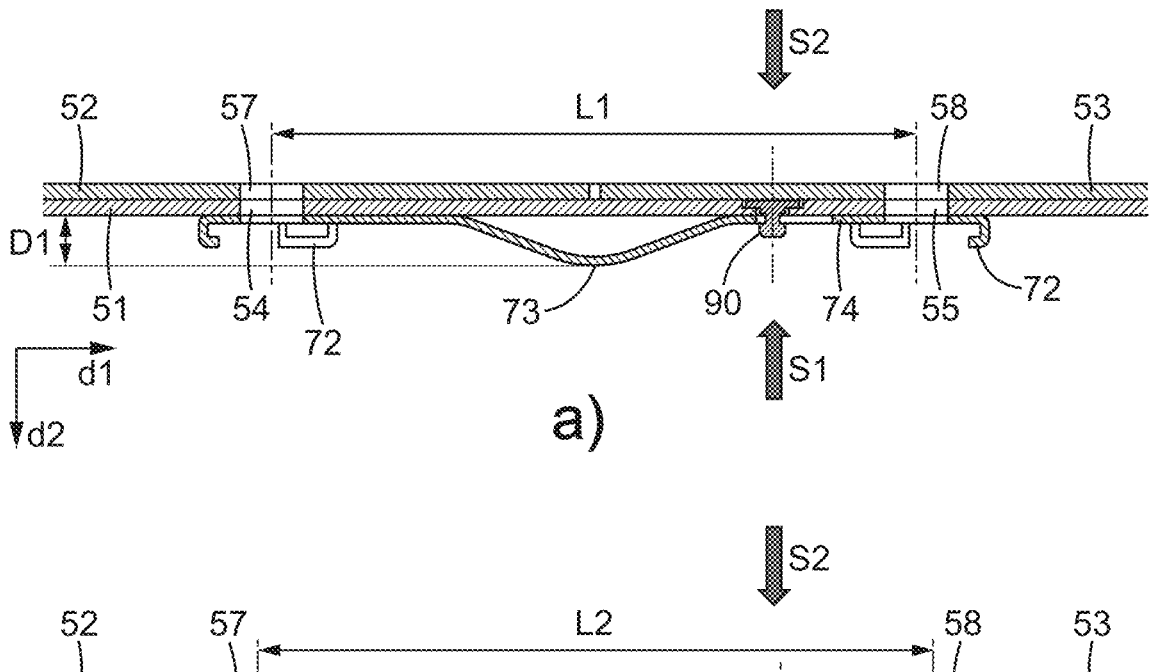
FIG. 7 includes FIGS. 7a and 7b which each show a schematic section view illustrating the assembly of FIG. 4, respectively between a rest state and an expanded state.
Figure 8:
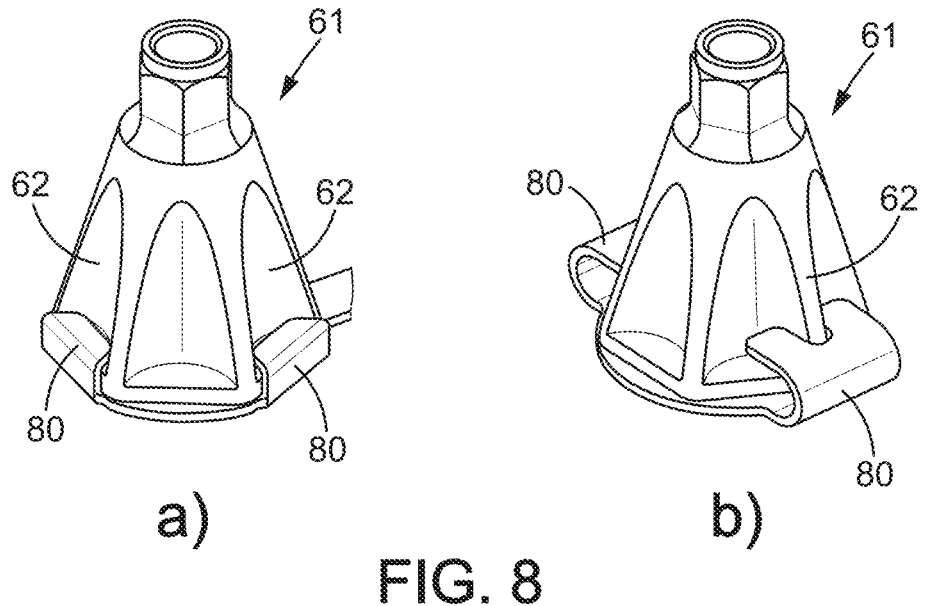
FIG. 8 includes FIGS. 8a and 8b which each show a perspective view of an alternative embodiment of a nut recess of the nut device of FIG. 5.

To do this, with reference to FIG. 7, first portion 73 of connecting element 71 is elastically deformable in order to compensate for the greater thermal expansion of retainer 70. First portion 73 of the connecting element is deformable between:

a rest state (FIG. 7*a*) in which connecting element 71 is subjected to the first temperature and in which first portion 73 of connecting element 71 is in a conformation having a first dimension D1 in second direction d2, and an expanded state (FIG. 7*b*) in which connecting element 71 is subjected to the second temperature which is higher than the first temperature and in which first portion 73 of connecting element 71 is in a conformation having a second dimension D2 in second direction d2.

As can be seen in FIG. 7, second dimension D2 of first portion 73 of connecting element 71 in the expanded state is greater than first dimension D1 of first portion 73 of connecting element 71 in the rest state.

In particular, the conformation of first portion 73 of connecting element 71 in the rest state and in the expanded state is a bowing in second direction d2. The maximum deflection formed by the bowing of first portion 73 of connecting element 71 in the rest state may be less than the maximum deflection formed by the bowing of first portion 73 of connecting element 71 in the expanded state. The connecting element may have a thickness adapted to facilitate its deformation in second direction d2. The thickness of the connecting element may be less than or equal to 2 mm.

A clearance in first direction d1 is also provided between second structural element 52 and third structural element 53. This allows preventing second structural element 52 and third structural element 53 from bearing against each other, in first direction d1, and exerting mechanical stresses on each other when they thermally expand during operation of the turbine engine, which could damage them.

Furthermore, connecting element 71 of retainer 70 comprises a second portion 74 that is less deformable than first portion 73. It is noteworthy that second portion 74 of connecting element 71 is closer to second recess 72 than first portion 73 of connecting element 71. Second portion 74 of connecting element 71 is more particularly visible in FIG. 6*a*. Second portion 74 is applied against the inner face of first structural element 51. Second portion 74 comprises a passage 75. Passage 75 comprises a guide portion 76 extending in first direction d1. Guide portion 76 of passage 75 formed through second portion 74 of connecting element 71 has the shape of a slot extending in first direction d1.

The assembly further comprises a holding member 90 which is more particularly visible in FIGS. 6*a* and 6*b*. Holding member 90 is fixed relative to first structural element 51. Holding member 90 comprises a cylindrical portion 91 along a first axis A1 which projects from the inner face of first structural element 51. First axis A1 extends along second direction d2. Cylindrical portion 91 traverses guide portion 76 of passage 75 formed through second portion 74 of connecting element 71. Rotation of retainer 70 of nut device 60 relative to first structural element 51 is thus avoided when fixing retainer 70 to first structural element 51 by screwing first screw 63 into nut 61 retained in first recess 72, and especially when fixing third structural element 53 to first structural element 51 by screwing second screw 63 into nut 61 retained in second recess 72. Also, guide portion 76 of passage 75 formed through second portion 74 of connecting element 71 allows movement of cylindrical portion 91 of holding member 90 along the first direction in passage 75 when retainer 70 thermally expands more than first structural element 51 during operation of the turbine engine.

Holding member 90 also comprises a first retention portion 92 for retention in a first directional sense S1 along first axis A1, which is connected to a first end of cylindrical portion 91. First retention portion 92 has a bearing face which bears, in the direction of first axis A1, against a face of second portion 74 of connecting element 71 which is opposite to first structural element 51. This makes it possible to keep second portion 74 of connecting element 71 applied against the inner face of first structural element 51. Holding member 90 allows maintaining the alignment between nut 61 retained in second recess 72 of retainer 70 and second hole 55 formed through first structural element 51, in particular after retainer 70 has been fixed to first structural element 51 by screwing first screw 63 into nut 61 retained in first recess 72.

Guide portion 76 of passage 75 formed through second portion 74 of connecting element 71 has a dimension in third direction d3 that is smaller than the dimension of first retention portion 92 of holding member 90 in third direction d3. This prevents first retention portion 92 from being removed from holding member 90 via guide portion 76 of passage 75 in first directional sense S1 along first axis A1.

Passage 75 formed through second portion 74 of connecting element 71 comprises an insertion portion 77 adapted for inserting first retention portion 92 of holding member 90 through passage 75 formed through connecting element 71. Insertion portion 77 is located at one end of guide portion 76 of passage 75, along first direction d1.

Cylindrical portion 91 of holding member 90 also traverses a third hole 56 formed through first structural element 51. Holding member 90 comprises a second retention portion 93 for retention in a second directional sense S2 along first axis A1, which is connected to a second end of cylindrical portion 91. Second retention portion 93 comprises a bearing face which bears, along the direction of first axis A1, against the outer face of first structural element 51.

First structural element 51 comprises in particular an indentation around third hole 56, such that the outer face of first structural element 51 forms a shoulder with which the bearing face of second retention portion 93 is in contact. Second retention portion 93 is then entirely received in the indentation. Third structural element 53 may thus cover an area of the outer face of first structural element 51 in which the indentation is formed.

Figure 9:
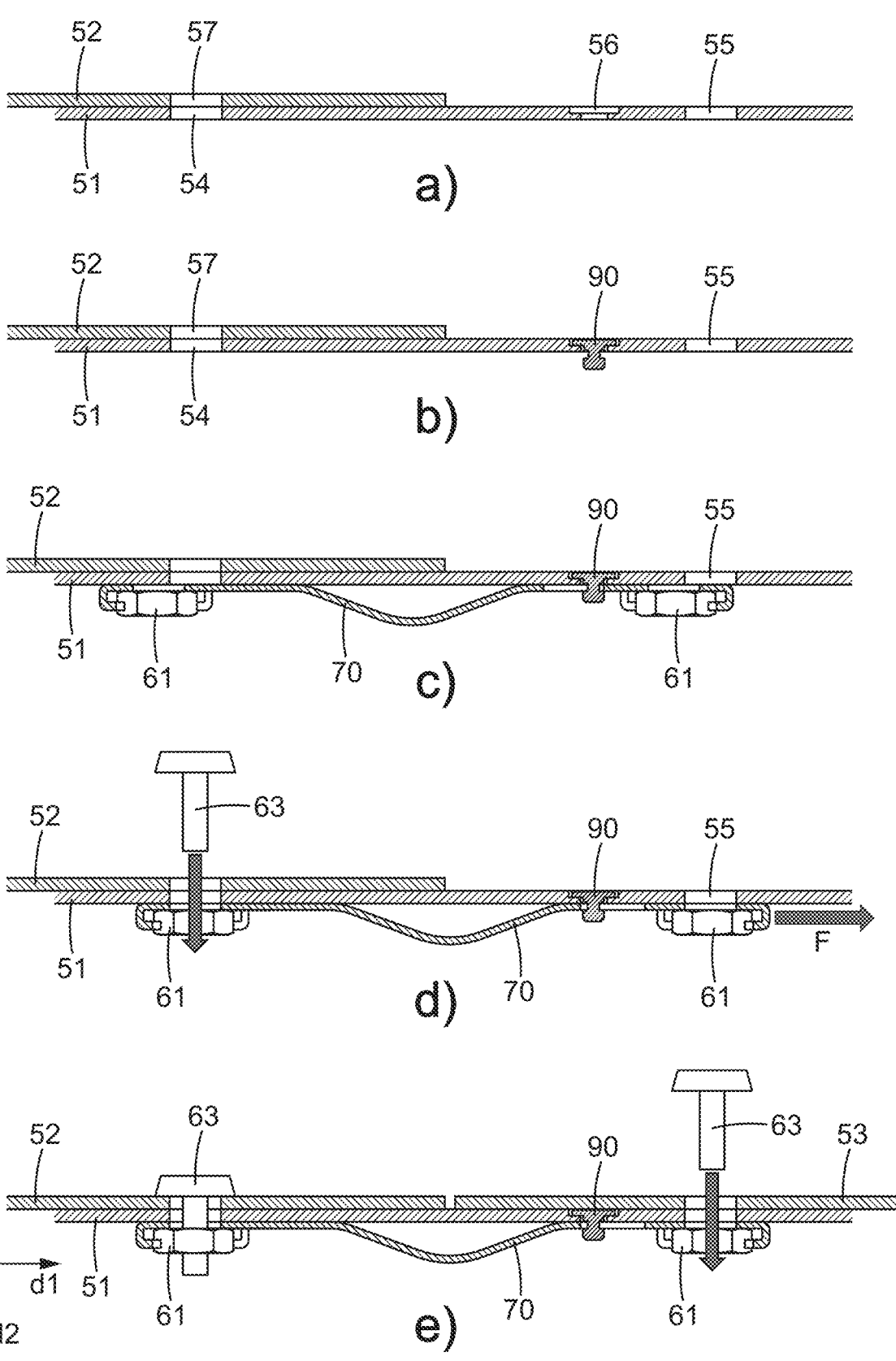
FIG. 9 includes FIGS. 9a to 9e, which schematically represent a method of assembling the assembly of FIG. 4.

Reference is now made more particularly to FIG. 9, which schematically represents a method of assembling the assembly for a turbine engine as described above.

The method comprises a first step which can be seen in FIG. 9a. The first step comprises applying second structural element 52 on the outer face of first structural element 51 so that hole 57 formed through second structural element 52 is aligned with first hole 54 formed through first structural element 51.

The method comprises a second step which can be seen in FIG. 9b. The second step comprises inserting holding member 90 into third hole 56 formed through first structural element 51 so that the bearing face of second retaining part 93 is bearing, in the direction of first axis A1, against the outer face of first structural element 51. Second retaining part 93 is in particular entirely housed in the indentation in first structural element 51.

The method comprises a third step which can be seen in FIGS. 9c and 9d. The third step comprises applying retainer 70 of nut device 60 to the inner face of first structural element 51 such that nut 61 retained in first recess 72 and nut 61 retained in second recess 72 are respectively aligned with first hole 54 and second hole 55 formed through first structural element 51.

To do this, the applying of retainer 70 of nut device 60 to the inner face of first structural element 51 comprises:

inserting first retention portion 92 of holding member 90 into insertion portion 77 of passage 75 formed through second portion 74 of connecting element 71, moving retainer 70 relative to first structural element 51 along first direction d1 as shown by arrow F.

This allows moving cylindrical portion 91 of holding member 90 along the first direction within guide portion 76 of passage 75 formed through second portion 74 of connecting element 71 and to place the bearing face of first retention portion 92 so that it is bearing against the face of second portion 74 of connecting element 71 which is opposite to first structural element 51.

The method comprises a fourth step which can be seen in FIG. 9d. The fourth step comprises the fixing of retainer 70 of nut device 60 to first structural element 51.

The fixing of retainer 70 of nut device 60 to first structural element 51 may comprise:

inserting first screw 63 through hole 57 formed through second structural element 52 and first hole 54 formed through first structural element 51;

screwing first screw 63 into nut 61 retained in first recess 72 of retainer 70 of nut device 60.

The method comprises a fifth step which can be seen in FIG. 9e. The fifth step comprises:

applying third structural element 53 to the outer face of first structural element 51 so that hole 58 formed through third structural element 53 is aligned with second hole 55 formed through first structural element 51;

inserting second screw 63 through hole 58 formed through third structural element 53 and second hole 55 formed through first structural element 51;

"blind" screwing second screw 63 into nut 61 retained in second recess 72 of retainer 70 of nut device 60.

Here, holding member 90 fulfills a rotation-prevention function against nut 61 of second recess 72 during the screwing of second screw 63.

The invention claimed is:

1. An assembly for a turbine engine having a longitudinal axis, the assembly comprising a first structural element and a nut device, the first structural element comprising a first hole and a second hole, the nut device comprising a retainer fixed to an inner face of the first structural element, the retainer comprising at least a first recess and a second recess connected to one another by a connecting element, the first recess and the second recess each retaining a nut aligned respectively with the first hole and the second hole which are formed through the first structural element, the connecting element being adapted, in whole or in part, to compensate for a greater thermal expansion of the retainer than the thermal expansion of the first structural element.

2. The assembly according to claim 1, wherein the first recess and the second recess of the retainer of the nut device are spaced apart from each other in a first direction, the connecting element being deformable, in whole or in part, to compensate for the greater thermal expansion of the retainer between:

a rest state in which the connecting element is subjected to a first temperature and in which the connecting element is in a conformation having a first dimension in a second direction perpendicular to the first direction, and an expanded state in which the connecting element is subjected to a second temperature which is higher than the first temperature and in which the connecting element is in a conformation having a second dimension-in the second direction, the second dimension being different from the first dimension.

3. The assembly according to claim 2, wherein the conformation of the connecting element in the rest state may be a bowing in the second direction and/or the conformation of the connecting element in the expanded state may be a bowing in the second direction.

4. The assembly according to claim 1, wherein the first structural element is made of a material whose coefficient of thermal expansion is lower than the coefficient of thermal expansion of a material in which the retainer of the nut device is made.

5. The assembly according to claim 1, the assembly comprising a second structural element applied to an outer face of the first structural element, the second structural element comprising a hole aligned with the first hole formed through the first structural element, the second structural element being fixed to the first structural element by a first screw which traverses the first hole formed through the first structural element and the hole formed through the second structural element, the first screw being screwed into the nut retained in the first recess of the retainer of the nut device.

6. The assembly according to claim 5, the assembly comprising a third structural element applied to an outer face of the first structural element, the third structural element comprising a hole aligned with the second hole formed through the first structural element, the third structural element being fixed to the first structural element by a second screw which traverses the second hole formed through the first structural element and the hole formed through the third structural element, the second screw being screwed into the nut retained in the second recess of the retainer of the nut device.

7. The assembly according to claim 2, wherein the connecting element of the retainer comprises a first portion which is deformable between the rest state and the expanded state, and a second portion which is less deformable than the first portion, the second portion being applied against the inner face of the first structural element, the second portion comprising a passage which comprises a guide portion extending in the first direction, the assembly further comprising a holding member which is fixed relative to the first structural element, the holding member comprising a cylindrical portion along a first axis which projects from the inner face of the first structural element, the cylindrical portion traversing the guide portion of the passage formed through the second portion of the connecting element.

8. The assembly according to claim 7, wherein the holding member comprises a first retention portion for retention in a first directional sense along the first axis, connected to a first end of the cylindrical portion, the first retention portion having a bearing face which bears, in the direction of the first axis, against a face of the second portion of the connecting element which is opposite to the first structural element.

9. The assembly according to claim 7, wherein the first structural element comprises a third hole, the cylindrical portion of the holding member traversing the third hole formed through the first structural element, the holding member comprising a second retention portion for retention in a second directional sense along the first axis, connected to a second end of the cylindrical portion, the second retention portion comprising a bearing face which bears, in the direction of the first axis, against an outer face of the first structural element.

10. A method of assembling the assembly according to claim 1, the method comprising:

applying the retainer of the nut device to the inner face of the first structural element such that the nut retained in the first recess and the nut retained in the second recess are respectively aligned with the first hole and the second hole which are formed through the first structural element;

fixing the retainer of the nut device to the first structural element.

* * * * *